United States Patent Office 3,574,748
Patented Apr. 13, 1971

3,574,748
β-ALKOXY-ACRYLIC ACID AMIDES
Dietmar Mayer, Leverkusen, Klaus Sasse, Cologne-Stammheim, and Ingeborg Hammann, Cologne, Germany, assignors to Farbenfabriken Bayer Aktiengesellschaft, Leverkusen, Germany
No Drawing. Filed Mar. 24, 1969, Ser. No. 810,024
Claims priority, application Germany, Mar. 25, 1968,
P 17 68 041.0
Int. Cl. C07c 103/30
U.S. Cl. 260—561                    10 Claims

ABSTRACT OF THE DISCLOSURE

β-Alkoxy-acrylic acid amides, i.e. β-(alkoxy, cycloalkoxy, alkyl-cycloalkoxy and alkyl-cycloalkyl-alkoxy) acrylic acid N-(alkyl, alkenyl, cycloalkyl, alkyl-cycloalkyl, phenyl-alkyl and chloro-phenyl-alkyl)-N-(unsubstituted and optionally alkyl, alkenyl, cycloalkyl and phenyl-alkyl)-amides, which possess pesticidal, especially insecticidal and acaricidal, properties and which may be produced by reacting the corresponding β-alkoxy-acrylic acid chloride with the appropriate amine.

The present invention relates to and has for its objects the provision for particular new β-alkoxy-acrylic acid amides, i.e. β-(alkoxy, cycloalkoxy, alkyl-cycloalkoxy and alkyl-cycloalkyl-alkoxy)-acrylic acid N-(alkyl, alkenyl, cycloalkyl, alkyl-cycloakyl, phenyl-alkyl and chloro-phenyl-alkyl)-N-(unsubstituted and optionally alkyl, alkenyl, cycloalkyl and phenyl-alkyl)-amides, which possess pesticidal especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

β-Ethoxy-acrylic acid N-phenyl amide (A) and β-ethoxy-acrylic acid N-parachloro-phenyl amide (B) are known compounds, no insecticidal or acaricidal activity of which is known (Angew. Chem. 76, 188 (1964)).

It has been found, in accordance with the present invention, that the particular new β-alkoxy-acrylic acid amides of the formula

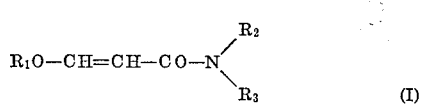

in which
R$_1$ is alkyl of 3–12 carbon atoms, cycloalkyl of 5–7 ring carbon atoms, alkyl-substituted cycloalkyl of 5–7 ring carbon atoms having 1–3 carbon atoms in the alkyl substituent moiety, and alkyl-substituted cycloalkyl-alkyl having 1–3 carbon atoms in the alkyl substituent moiety, 5–7 ring carbon atoms in the cycloalkyl moiety and 1–4 carbon atoms in the alkyl moiety;
R$_2$ is alkyl of 1–12 carbon atoms, alkenyl of 2–6 carbon atoms, cycloalkyl of 5–7 ring carbon atoms, alkyl-substituted cycloalkyl of 5–7 ring carbon atoms having 1–3 carbon atoms in the alkyl substituent moiety, phenyl-alkyl having 1–4 carbon atoms in the alkyl moiety, and chloro-substituted phenyl-alkyl having 1–4 carbon atoms in the alkyl moiety; and
R$_3$ is hydrogen, alkyl of 1–4 carbon atoms, alkenyl of 2–6 carbon atoms, cycloalkyl of 5–7 ring carbon atoms, and phenyl-alkyl having 1–4 carbon atoms in the alkyl moiety, exhibit strong pesticidal, especially insecticidal and acaricidal, properties.

The present invention furthermore provides a process for the production of compounds of Formula (I) above in which a β-alkoxy-acrylic acid chloride of the formula

in which R$_1$ is the same as defined above, is reacted with an amine of the formula

in which R$_2$ and R$_3$ are the same as defined above, in the presence of an acid-binding agent.

Surprisingly, the β-alkoxy-acrylic acid amides of the present invention show a considerably higher insecticidal and acaricidal activity than the previously known, chemically closest compounds, i.e. β-ethoxy-acrylic acid N-phenyl amide (A) and -chlorophenyl amide (B). The active compounds according to the present invention therefore represent a valuable enrichment of the art.

If β-isobutoxy-acrylic acid chloride and cyclohexylamine are used as starting materials, the reaction course can be represented by the following formula scheme:

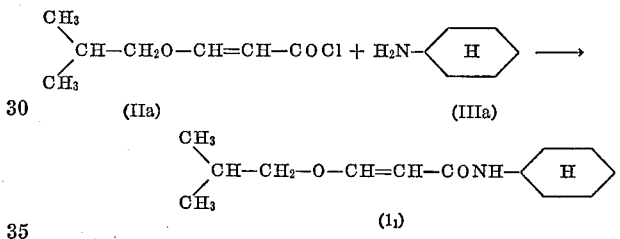

Advantageously, in accordance with the present invention, in the various formulae herein:

R$_1$ represents straight and branched chain alkyl of more than 2 carbon atoms such as n- and iso-propyl, n-, iso, sec- and tert-butyl, amyl, isoamyl, hexyl, isohexyl, heptyl, octyl, nonyl, decyl, undecyl, dodecyl, and the like, especially C$_{3-8}$ or C$_{3-4}$ alkyl;
cycloalkyl of 5–7 ring carbon atoms such as cyclo-pentyl, -hexyl, -heptyl, and the like, especially cyclohexyl;
alkyl-substituted cycloalkyl of 5–7 ring carbon atoms having 1–3 carbon atoms in the alkyl substituent moiety such as methyl, ethyl, n- and isopropyl -substituted- -cyclopentyl, -cyclohexyl, -cycloheptyl, and the like, especially 2-, 3- and 4 - position C$_{1-3}$ alkyl-substituted C$_{5-7}$ cycloalkyl, and more especially 2-, 3- and 4-methyl-cyclohexyl; or
alkyl-substituted cycloalkyl-alkyl having 1–3 carbon atoms in the alkyl substituent moiety, 5–7 ring carbon atoms in the cycloalkyl moiety and 1–4 carbon atoms in the alkyl moiety such as methyl, ethyl, n- and isopropyl -substituted- -cyclopentyl- -cyclohexyl- -cycloheptyl- -methyl, ethyl, n- and iso-propyl, n-, iso-, sec- and tert-butyl, and the like, especially 2,3- and 4-position C$_{1-3}$ alkyl-substituted C$_{5-7}$ cycloalkyl-C$_{1-4}$ or C$_{1-2}$ alkyl, and more especially 2-, 3- and 4-methyl-cyclohexyl-methyl;

R$_2$ represents straight and branched chain alkyl of 1–12 carbon atoms such as methyl, ethyl, n- and iso-propyl, n-, iso-, sec- and tert-butyl, amyl, isoamyl, hexyl, isohexyl, heptyl, octyl, nonyl, decyl, undecyl, dodecyl, and the like, especially C$_{1-8}$ or C$_{1-4}$ alkyl;
straight and branched chain alkenyl of 2–6 carbon atoms
straight and branched chain alkenyl of 3–6 carbon atoms such as allyl, but 2 and 3-enyl, 1-methyl-prop-2-enyl, 2-methyl-1-prop-2-enyl, pent-2,3 and 4-enyl, hex-2,3,4, and 5-enyl, and the like, especially $C_{3-4}$ or $C_3$ alkenyl;

cycloalkyl of 5–7 ring carbon atoms as defined above for $R_1$ and the like;

alkyl-substituted cycloalkyl of 5–7 ring carbon atoms having 1–3 carbon atoms in the alkyl substituent moiety as defined above for $R_1$, and the like, especially 2-, 3- and 4-position $C_{1-3}$ alkyl-substituted $C_{5-7}$ cycloalkyl, and more especially 2-, 3- and 4-methyl-cyclohexyl;

phenyl-alkyl having 1–4 carbon atoms in the alkyl moiety such as benzyl, phenyl -ethyl, n- and iso-propyl, n-, iso-, sec- and tert-butyl, and the like, especially phenyl-$C_{1-2}$ alkyl; or chloro-substituted phenyl-alkyl having 1–4 carbon atoms in the alkyl moiety such as chloro-substituted -benzyl to -phenyl tert-butyl inclusive, and the like, especially 2,- 3- and 4-position chloro-substituted phenyl-$C_{1-4}$ or $C_{1-2}$ alkyl, and more especially 2-, 3-, and 4-chloro-phenyl $C_{1-2}$ alkyl; and $R_3$ represents hydrogen;

straight and branched chain lower alkyl of 1–4 carbon atoms such as methyl, ethyl, n- and iso-propyl, n-, iso-, sec.- and tert-butyl, and the like, especially $C_{1-2}$ alkyl;

straight and branched chain alkenyl of 3–6 carbon atoms such as allyl to hex- ,2,3,4 and 5-enyl inclusive, and the like, as defined above for $R_2$, especially $C_{3-4}$ or $C_3$ alkenyl;

cycloalkyl of 5–7 ring carbon atoms as defined above for $R_1$, and the like; or phenyl-alkyl having 1–4 carbon atoms in the alkyl moiety as defined above for $R_2$, especially phenyl-$C_{1-2}$ alkyl.

Preferably, $R_1$ is $C_{3-12}$ or $C_{3-8}$ or $C_{3-4}$ alkyl; or $C_{5-7}$ or $C_6$ cycloalkyl; or $C_{1-3}$ or $C_1$ alkyl-$C_{5-7}$ or $C_6$ cycloalkyl; or $C_{1-3}$ or $C_1$ alkyl-$C_{5-7}$ or $C_6$ cycloalkyl-$C_{1-4}$ or $C_{1-2}$ or $C_1$ alkyl; $R_2$ is $C_{1-22}$ alkyl; $C_{2-6}$ or $C_{2-4}$ or $C_3$ alkenyl; or $C_{5-7}$ or $C_6$ cycloalkyl; or $C_{1-3}$ or $C_1$ alkyl-$C_{5-7}$ or $C_6$ cycloalkyl; or phenyl-$C_{1-4}$ or $C_{1-2}$ alkyl; or chloro-phenyl-$C_{1-4}$ or $C_{1-2}$ alkyl; and $R_3$ is hydrogen; or $C_{1-4}$ or $C_{1-2}$ alkyl; or $C_{2-6}$ or $C_{2-4}$ or $C_3$ alkenyl; or $C_{5-7}$ or $C_6$ cycloalkyl; or phenyl-$C_{1-4}$ or $C_{1-2}$ alkyl.

In particular, $R_1$ is $C_{3-8}$ alkyl; or cyclohexyl; or $C_{1-3}$ alkyl-cyclohexyl; or $C_{1-3}$ alkyl-cyclohexyl-$C_{1-2}$ alkyl; $R_2$ is $C_{1-12}$ alkyl; or cyclohexyl; or $C_{1-3}$ alkyl-cyclohexyl; and $R_3$ is hydrogen; or $C_{1-4}$ alkyl.

Among the active compounds according to the invention, there are to be mentioned in particular:

(4) β-(n-butoxy)-acrylic acid N-isobutyl-amide,
(2) β-isobutoxy-acrylic acid N-isobutyl-amide,
(5) β-(n-butoxy)-acrylic acid N-(sec.-butyl)-amide,
(23) β-isobutoxy-acrylic acid N-(tert-butyl)-amide,
(1) β-isobutoxy-acrylic acid N-cyclohexyl-amide,
(19) β-isobutoxy-acrylic acid N-(3-methyl-cyclohexyl)-amide,
(25) β-isobutoxy-acrylic acid N-(4-methyl-cyclohexyl)-amide,
(16) β-cyclohexoxy-acrylic acid N-isobutyl-amide,
(17) β-cyclohexoxy-acrylic acid N-cyclohexyl-amide,
(14) β-(n-octyloxy)-acrylic acid N-(sec.-butyl)-amide, and
(15) β-(n-octyloxy)-acrylic acid N-cyclohexyl-amide.

The acid chlorides usable as starting reactants are clearly characterized by Formula (II) above.

The acid chlorides usable as starting materials have not yet been published but can be prepared by a process known in principle (compare U.S. Pat. 2,768,174) by reacting the appropriate precursor alkyl-, cycloalkyl- or alkyl-cycloalkyl-alkyl- vinyl ethers with phosgene at a temperature from 0 to 10° C. in the presence of tertiary amines, such as triethylamine or pyridine, according to the following formula scheme:

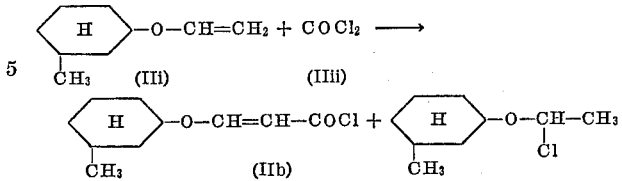

For this purpose, it is preferable to proceed in such a manner that 1 mol of the precursor vinyl ether concerned is added to 1 mol of liquefied phosgene at 0 to 10° C. in the persence of about 0.1 mol of triethylamine. After standing for 2 days at room temperature, any unreacted phosgene is removed in a vacuum at room temperature, the reaction mixture is taken up in ether and, after filtration, fractionated in a vacuum.

As examples of such acid chlorides which can be used as starting reactants, there are mentioned in particular: β-isopropoxy-acrylic acid chloride, β-(n-butoxy)acrylic acid chloride, β-isobutoxy-acrylic acid chloride, β-(n-octyloxy)-acrylic acid chloride, β-cyclohexoxy-acrylic acid chloride, β-(2-methyl-cyclohexoxy)-acrylic acid chloride, β-(4-methylcyclohexoxy)-acrylic acid chloride; and the like.

The amines usable as starting reactants are clearly characterized by Formula (III) stated above.

Such starting amines are well known and can be produced on an industrial scale.

As examples of such amines which can be used as starting reactants, there are mentioned in particular: methylamine, dimethylamine, n-propylamine, isopropylamine, n-butylamine, sec.-butylamine, isobutylamine, tert-butylamine, 2-ethyl-hexylamine, n-dodecylamine, allylamine, diallylamine, cyclohexylamine, 2-methyl-cyclohexylamine, 3-methyl-cyclohexylamine, 4-methylcyclohexylamine, dicyclohexylamine, benzylamine, 2-chlorobenzylamine, 3-chlorobenzylamine, dibenzylamine, β-phenyl-ethylamine, and the like.

The reaction of the β-alkoxy-acrylic acid chlorides to give the β-alkoxyacrylic acid amides according to the present invention is carried out in such a manner that an acid chloride of Formula (II) is added to an amine of Formula (III)—optionally dissolved in a suitable solvent—in the presence of an acid-binding agent, optionally with cooling.

As solvents (this term includes mere diluents) all inert organic solvents are suitable. These include, in particular, hydrocarbons, such as benzene, toluene, cyclohexane, and ethers, such as diethyl ether, dioxan and tetrahydrofuran, and the like.

As acid-binding agents, all customary acid-binding agents can be used. Tertiary amines, such as triethylamine and pyridine are preferred. An excess of the amine to be reacted may also be used as acid-binding agent.

The reaction temperatures can be varied within a fairly wide range. In general, the work is carried out at substantially between about −10 to 50° C., preferably between about 0 to 20° C.

When carrying out the production reaction, 1 mol of the β-alkoxy-acrylic acid chloride and 1 to 10 mols of acid-binding agent are generally used to 1 mol of the amine. When an excess of acid-binding agent, such as pyridine, is used, a separate solvent can be dispensed with. The temperature during the dropwise addition of the acid chloride is preferably kept below 20° C. by cooling.

Working up takes place in the usual manner, for example by pouring the reaction mixture into water and taking up in ether the product which separates or the organic phase which is formed when solvents which are not miscible with water are used. After washing with dilute hydrochloric acid and water and drying over a drying agent, such as sodium sulfate and magnesium sulfate, the solution of the product is concentrated and the product remaining is purified by recrystallization or vacuum distillation.

Advantageously, the active compounds according to the present invention exhibit strong insecticidal and acaricidal activities, with comparatively low toxicity to warm-blooded animals and concomitantly low phytotoxicity. The effects set in rapidly and are long-lasting. The instant active compounds can therefore be used with favorable results for the control of noxious sucking and biting insects, *Diptera* and mites (*Acarina*).

To the sucking insects contemplated herein there belong, in the main: aphids, such as the green peach aphid (*Myzus persicae*), the bean aphid (*Doralis fabae*); scales, such as *Aspidiotus hederae, Lecanium hesperidum, Pseudococcus maritimus*; *Thysanoptera*, such as *Hercinothrips femoralis*; and bugs, such as the beet bug (*Piesma quadrata*) and the bed bug (*Cimex lectularius*), and the like.

With the biting insects contemplated herein there are classed, in the main: butterfly caterpillars, such as *Plutella maculipennis, Lymantria dispar*; caterpillars of the silk moth (*Bombyx mori*); bettles, such as granary weevils (*Sitophilus granarius*), the Colorado beetle (*Leptinotarsa decemlineata*), but also species living in the soil, such as the wireworms (*Agriotes* sp.) and larvae of the cockchafer (*Melolontha melolontha*); cockroaches, such as the German cockroach (*Blattella germanica*); *Orthoptera*, such as the house cricket (*Gryllus domesticus*); termites, such as *Reticulitermes*; *Hymenoptera*, such as ants; and the like.

The *Diptera* contemplated herein comprise in particular the flies, such as the vinegar fly (*Drosophila melanogaster*), the Mediterranean fruit fly (*Ceratitis capitata*), the house fly (*Musca domestica*) and mosquitoes, such as the yellow fever mosquito (*Aedes aegypti*); and the like.

In the case of the mites contemplated herein, particularly important are the spider mites (*Tetranychidae*) such as the two-spotted spider mite (*Tetranychus urticae*), the European red mite (*Paratetranychus pilosus*); blister mites, for example the currant blister mite (*Eriophyes ribis*) and tarsonemids, such as *Tarsonemus pallidus*; and ticks, and the like.

Significantly, the instant compounds also exhibit effective molluscicidal activity.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amide (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides or molluscicides, or nematicides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplates those in which the active compound is present in an amount substantially between about 0.00001–20%, preferably 0.0002–20%, and most preferably 0.01–2.0%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water, preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

Where the usual aqueous active compound preparations are involved, the active compound concentrations preferably range between about 0.001–2.0% by weight of the mixture.

The active compound can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively controlling or combating pests, e.g. arthropods, i.e. insects and acarids, and more particularly, methods of killing, combating or controlling at least one of insects and acarids which comprise applying to at least one of correspondingly (a) such insects, (b) such acarids and (c) the corresponding habitat, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instant by spraying, atomizing, fumigating, vaporizing, scattering, dusting, watering, sprinkling, pouring, and the like.

It will be realized, of course, that the concentration of the particular active compound utilized in admixture with the carrier vehicle will depend upon the intended application.. Therefore, in special cases it is possible to go above or below the aforementioned concentration ranges.

After the specified period of time noted below, the degree of destruction is determined as a percentage: 100% means that all the caterpillars are killed whereas 0% means that none of the caterpillars are killed.

The particular active compounds tested, their concentrations, the evaluation time and the results obtained can be seen from the following Table 1:

TABLE 1

(Plant-damaging insects)

Plutella

| Active compound | Concentration of active compound in percent | Degree of destruction in percent after 3 days |
|---|---|---|
| (A) $C_2H_5-O-CH=CH-CO-NH-$⟨phenyl⟩ (known) | 0.2 | 0 |
| (B) $C_2H_5-O-CH=CH-CO-NH-$⟨phenyl⟩$-Cl$ (known) | 0.2 | 0 |
| ($2_1$) $(CH_3)_2CH-CH_2-O-CH=CH-CO-NH-CH_2-CH(CH_3)_2$ | 0.2 | 100 |
| ($3_1$) $(CH_3)_2CH-CH_2O-CH=CH-CO-NH-\underset{C_2H_5}{\overset{CH_3}{CH}}$ | 0.2 | 100 |
| ($4_1$) $CH_3(CH_2)_3O-CH=CH-CO-NH-CH_2-CH(CH_3)_2$ | 0.2 | 100 |
| ($5_1$) $CH_3(CH_2)_3-O-CH=CH-CO-NH-\underset{C_2H_5}{\overset{CH_3}{CH}}$ | 0.2 / 0.02 | 100 / 50 |
| ($6_1$) $CH_3(CH_2)_7-O-CH=CH-CO-NH-(CH_2)_3CH_3$ | 0.2 / 0.02 | 100 / 90 |
| ($7_1$) ⟨phenyl-H⟩(with $CH_3$)$-O-CH=CH-CO-N(CH_3)_2$ | 0.2 | 100 |
| ($8_1$) $CH_3-$⟨phenyl-H⟩$-O-CH=CH-CO-NH-CH_2-CH(CH_3)_2$ | 0.2 / 0.02 | 100 / 100 |
| ($9_1$) ⟨phenyl-H⟩$-O-CH=CH-CO-NH-(CH_2)_3CH_3$ | 0.2 | 100 |
| ($10_1$) $CH_3-$⟨phenyl-H⟩$-O-CH=CH-CO-NH-$⟨phenyl-H⟩ | 0.2 / 0.02 | 100 / 35 |
| ($11_1$) $CH_3-$⟨phenyl-H⟩$-CH_2-O-CH=CH-CO-NH-$⟨phenyl-H⟩ | 0.2 | 100 |
| ($12_1$) $(CH_3)_2CH-O-CH=CH-CO-NH-$⟨phenyl-H⟩ | 0.2 | 100 |
| ($1_2$) $(CH_3)_2CH-CH_2-O-CH=CH-CO-NH-$⟨phenyl-H⟩ | 0.2 / 0.02 / 0.002 | 100 / 100 / 50 |

The outstanding activity of the particular new compounds of the present invention is illustrated without limitation by the following examples:

EXAMPLE 1

Plutella test

Solvent: 3 parts by weight dimethyl formamide.
Emulsifier: 1 part by weight alkylaryl polyglycol ether.
To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the given active compound preparation until dew moist and then infested with caterpillars of the diamond-back moth (*Plutella maculipennis*).

EXAMPLE 2

Bombyx test

Solvent: 3 parts by weight dimethyl formamide.
Emulsifier: 1 part by weight alkylaryl polyglycol ether.
To produce a suitable preparation of the particular active compound, 1 part by weight of such active compound is mixed with the stated amount of solvent containing the stated amount of emulsifier, and the resulting concentrate is diluted with water to the desired final concentration.

Mulberry leaves (*Morus alba*) are sprayed with the given active compound preparation until dew-moist and then infested with caterpillars of the silk moth (*Bombyx mori*).

After the specified period of time noted below, the degree of destruction is determined as a percentage. 100% means that all the caterpillars were killed, whereas 0% means that no caterpillars were killed.

The particular active compounds tested, their concentrations, the evaluation time and the results obtained can be seen from the following Table 2:

Bean plants (*Phaseolus vulgaris*), which have a height approximately 10–30 cm., are sprayed with the given active compound preparation until dripping wet. These

TABLE 2
(Plant-damaging insects)

Bombyx

| Active compound | Concentration of active compound in percent | Degree of destruction in percent after 3 days |
|---|---|---|
| ($13_1$).. $CH_3(CH_2)_7-O-CH=CH-CO-NH-CH_2-CH(CH_3)_2$ | 0.2 | 100 |
| | 0.02 | 85 |
| ($14_1$).. $CH_3(CH_2)_7-O-CH=CH-CO-NH-CH(CH_3)(C_2H_5)$ | 0.2 | 100 |
| | 0.02 | 100 |
| | 0.002 | 55 |
| ($15_1$).. $CH_3(CH_2)_7-O-CH=CH-CO-NH-\langle H \rangle$ | 0.2 | 100 |
| | 0.02 | 100 |
| ($16_1$).. $\langle H \rangle-O-CH=CH-CO-NH-CH_2-CH(CH_3)_2$ | 0.2 | 100 |
| | 0.02 | 75 |
| ($17_1$).. $\langle H \rangle-O-CH=CH-CO-NH-\langle H \rangle$ | 0.2 | 100 |
| | 0.02 | 100 |
| | 0.002 | 90 |
| | 0.0002 | 50 |

EXAMPLE 3

Tetranychus test

Solvent: 3 parts by weight dimethyl formamide.
Emulsifier: 1 part by weight alkylaryl polyglycol ether.

To produce a suitable preparation of the particular active compound, 1 part by weight of such active compound is mixed with the stated amount of solvent containing the stated amount of emulsfier and the resulting concentrate is diluted with water to the desired final concentration.

bean plants are heavily infested with spider mites (*Tetranychus urticae*) in all stages of development.

After the specified period of time noted below, the effectiveness of the given active compound preparation is determined by counting the dead mites. The degree of destruction thus obtained is expressed as a percentage: 100% means that all the spider mites are killed whereas 0% means that none of the spider mites are killed.

The particular active compounds tested, their concentrations, the evaluation time and the results obtained can be seen from the following Table 3:

TABLE 3
(Plant-damaging mites)

*Tetranychus urticae*

| Active compound | Concentration of active compound in percent | Degree of destruction in percent after 3 days |
|---|---|---|
| (A) $C_2H_5-O-CH=CH-CO-NH-\langle \rangle$ (known) | 0.2 | 0 |
| (B) $C_2H_5-O-CH=CH-CO-NH-\langle \rangle-Cl$ (known) | 0.2 | 0 |
| ($18_1$).. $(CH_3)_2CH-CH_2-O-CH=CH-CO-NH-CH_2-CH(C_2H_5)((CH_2)_3CH_3)$ | 0.2 | 100 |
| | 0.02 | 20 |
| ($19_1$).. $(CH_3)_2CH-CH_2-O-CH=CH-CO-NH-\langle H(CH_3) \rangle$ | 0.2 | 95 |
| ($20_1$).. $CH_3(CH_2)_7-O-CH=CH-CO-N(CH_3)_2$ | 0.2 | 99 |
| | 0.02 | 20 |
| ($13_2$).. $CH_3(CH_2)_7-O-CH=CH-CO-NH-CH_2-CH(CH_3)_2$ | 0.2 | 90 |
| ($21_1$).. $CH_3-\langle H \rangle-O-CH=CH-CO-NH(CH_2)_{11}CH_3$ | 0.2 | 100 |

EXAMPLE 4

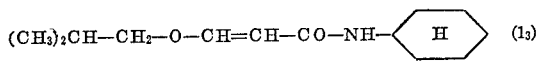 (1₃)

0.15 mol (24.4 g.) β-isobutoxy-acrylic acid chloride is added dropwise to 0.15 mol (14.9 g.) cyclohexylamine dissolved in 100 ml. of absolute pyridine. After subsidence of the reaction, stirring is continued for 1 hour at room temperature, the reaction mixture is poured into 500 ml. of water, and the product is taken up with ether. The ethereal solution, after washing with water and dilute hydrochloric acid, is dried over sodium sulfate and concentrated in a vacuum. The residue is recrystallized from white spirit with activated charcoal. Yield: 24.4 g. of β-isobutoxy-acrylic acid N-cyclohexyl-amide are obtained. M.P. 120 to 121° C.

EXAMPLE 5

$$CH_3(CH_2)_7-O-CH=CH-CO-NH-CH_2-CH(CH_3)_2 \quad (13_3)$$

0.1 mol (21.9 g.) β-(n-octyloxy)-acrylic acid chloride is added dropwise to a solution of 0.1 mol (7.3 g.) isobutylamine in 100 ml. of absolute pyridine. After standing overnight, the mixture is poured into water and the separated oily product is extracted with ether. The residue remaining behind after concentration of the ethereal phase is distilled in a vacuum. 17 g. (=67% of the theory) of β-(n-octyloxy)-acrylic acid N-isobutyl-amide are obtained as a colorless oil, B.P.: 174 to 176° C./0.2 mm. Hg, which solidifies in a crystalline form, M.P. 55 to 57° C.

EXAMPLE 6

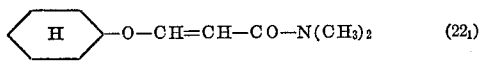 (22₁)

0.2 mol (16 g.) of absolute pyridine are added to a solution of 0.2 mol (9 g.) dimethylamine in benzene; a solution of 0.2 mol (36.7 g.) β-cyclohexoxy-acrylic acid chloride in 50 ml. of absolute benzene is added dropwise, with cooling. After subsidence of the reaction, the mixture is left to stand overnight. The reaction mixture is poured into water, and the organic phase is taken up in ether. After washing with dilute hydrochloric acid and water and drying over sodium sulfate, the ethereal phase is concentrated and the residue is distilled in a vacuum. The yield of β-cyclohexoxy-acrylic acid N,N-dimethylamide is 18.4 g. (=45% of the theory), B.P.: 123 to 124° C./0.3 mm. colorless oil which solidifies in a crystalline form, M.P. 44 to 46° C.

The acrylic acid chlorides required as starting materials can be prepared as follows:

(1) β-(n-octyloxy)-acrylic acid chloride.—2 mols (198 g.) phosgene are condensed by cooling with dry ice/methanol in a 3-necked flask fitted with stirrer, reflux condenser, thermometer and gas introducing tube. The cooling bath is replaced by an ice bath and, after the temperature has risen to 0° C., 0.15 mol (15 g.) of triethylamine cooled to 0° C. are added dropwise. 312 g. (2 mols) n-octyl-vinyl ether are then added dropwise over a period of 20 to 30 minutes at a temperature of 0 to 10° C. The temperature of the reaction mixture is allowed to rise slowly to room temperature, with stirring, and the mixture is allowed to stand at room temperature for 48 hours. 150 ml. of absolute ether are then added, and unreacted phosgene is removed by evaporation of the ether in a vacuum, more absolute ether is subsequently added and the precipitated triethylamine hydrochloride is filtered off. The filtrate is freed from ether in a vacuum and the residue is fractionated in a vacuum. 164 g. β-(n-octyloxy)-acrylic acid chloride, B.P.: 112° C./0.2 mm., are obtained as a colorless oil. $n_D^{20}=1.4785$.

(2) β-(3-methylcyclohexoxy)-acrylic acid chloride.— In the case of the reaction of 2.38 mols (333 g.) 3-methyl-cyclohexyl-vinyl ether with 2.38 mols (236 g.) phosgene in the presence of 0.18 mol triethylamine in the manner stated under (1), 202 g. β-(3-methyl-cyclohexoxy)-acrylic acid chloride are obtained as a pale yellow oil of B.P.: 95° C./0.1 mm. $n_D^{20}$: 1.5105.

In the same manner in principle as stated in the foregoing examples, the compounds of the Formula I listed in the following Table 4 can be prepared.

TABLE 4

| Compound | R₁ | R₂ | R₃ | Degrees C. |
|---|---|---|---|---|
| (12₂) | (CH₃)₂CH— |  | H | M.P. 142 to 144. |
| (2₂) | (CH₃)₂CH—CH₂— | (CH₃)₂CH—CH₂— | H | M.P. 32 to 33. |
| (3₂) | (CH₃)₂CH—CH₂— | CH₃(C₂H₅)CH— | H | M.P. 62 to 64. |
| (4₂) | n—C₄H₉— | (CH₃)₂CH—CH₂— | H | M.P. 52 to 53. |
| (5₂) | n—C₄H₉— | CH₃(C₂H₅)CH— | H | M.P. 64 to 64. |
| (23₁) | (CH₃)₂CH—CH₂— | (CH₃)₃C— | H | B.P. 117 to 120/0.3 mm. Hg. |
| (24₁) | (CH₃)₂CH—CH₂— |  (CH₃) | H | M.P. 93 to 96. |
| (19₂) | (CH₃)₂CH—CH₂— |  (CH₃) | H | B.P. 170 to 173/0.3 mm. Hg. |
| (25₁) | (CH₃)₂CH—CH₂— | CH₃— | H | M.P. 138 to 141. |
| (26₁) | (CH₃)₂CH—CH₂— |  |  | M.P. 77 to 79. |
| (18₂) | (CH₃)₂CH—CH₂— | CH₃(CH₂)₃—CH(C₂H₅)—CH₂ | H | B.P. 153 to 156/0.08 mm. Hg. |
| (27₁) | (CH₃)₂CH—CH₂— | —CH₂— (Cl) | H | M.P. 90 to 93. |
| (15₂) | n—C₈H₁₇— | 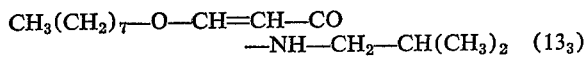 | H | M.P. 95 to 96. |

TABLE 4—Continued

| Compound | R₁ | R₂ | R₃ | Degrees C. |
|---|---|---|---|---|
| (14₂) | n—C₈H₁₇— | CH₃(C₂H₅)CH— | H | M.P. 55 to 57. |
| (17₂) | ⬡H | ⬡H | H | M.P. 158 to 159. |
| (28₁) | ⬡H | CH₃(C₂H₅)CH— | H | M.P. 89 to 90. |
| (29₁) | (CH₃)₂CH | CH₃— | CH₃— | B.P. 119 to 123/0.2 mm. Hg. |
| (30₁) | (CH₃)₂CH— | (CH₃)₂CH— | H | M.P. 104 to 106. |
| (31₁) | (CH₃)₂CH— | CH₂=CH—CH₂ | H | M.P. 37 to 38. |
| (32₁) | (CH₃)₂CH— | (CH₃)₂CH—CH₂ | H | M.P. 48 to 50. |
| (33₁) | (CH₃)₂CH—I | n—C₁₂H₂₅— | H | M.P. 70. |
| (34₁) | (CH₃)₂CH | CH₃(C₂H₅)CH | H | M.P. 125. |
| (35₁) | (CH₃)₂CH | CH₂=CH—CH₂ | CH₂=CH—CH₂— | B.P. 117 to 119/0.5 mm. Hg. |
| (36₁) | (CH₃)₂CH— | (CH₃)₃C | H | M.P. 105 to 107. |
| (37₁) | n—C₄H₉— | (CH₃)₂CH— | H | M.P. 72 to 74. |
| 38₁) | (CH₃)₂CH—CH₂— | ⬡—CH₂— | H | M.P. 73 to 74. |
| (39₁) | (CH₃)₂CH—CH₂— | ⬡—CH₂— | ⬡—CH₂— | M.P. 46 to 49. |
| (40₁) | (CH₃)₂CH—CH₂ | (CH₃)₂CH— | H | M.P. 63 to 65. |
| (41₁) | (CH₃)₂CH—CH₂— | ⬡—C₂H₄— | H | M.P. 52 to 54. |
| (42₁) | (CH₃)₂CH—CH₂— | n—C₃H₇— | H | M.P. 47 to 50. |
| (43₁) | (CH₃)₂CH—CH₂— | Cl-⬡—CH₂— | H | M.P. 81 to 85. |
| (44₁) | (CH₃)₂CH—CH₂— | CH₃— | H | M.P. 49 to 52. |
| 45₁) | ⬡H | CH₃\CH—/C₂H₅ | H | M.P. 97 to 99. |
| (46₁) | n—C₈H₁₇— | CH₃— | H | M.P. 50 to 53. |
| (47₁) | ⬡H | CH₃— | H | M.P. 83 to 85. |
| (6₂) | n—C₈H₁₇— | n—C₄H₉— | H | M.P. 45 to 48. |
| (9₂) | ⬡H | n—C₄H₉— | H | M.P. 54 to 57. |
| (48₁) | ⬡H | CH₂=CH—CH₂— | H | M.P. 65 to 68. |
| (49₁) | ⬡H | (CH₃)₂CH— | H | M.P. 72 to 75. |
| (50₁) | ⬡H | n—C₃H₇— | H | M.P. 60 to 63. |
| (51₁) | ⬡H | ⬡H | H | M.P. 149 to 152. |
| (52₁) | CH₃-⬡H-CH₃ | (CH₃)₂CH—CH₂— | H | B.P. 163/0.3 mm. Hg. |
| (20₂) | n—C₈H₁₇— | CH₃ | CH₃— | B.P. 135 to 138/0.25 mm. Hg. |
| (7₂) | CH₃-⬡H | CH₃— | CH₃— | B.P. 121 to 125/0.3 mm. Hg. |
| (10₂) | CH₃-⬡H- | ⬡H | H | M.P. 178 to 181. |
| (8₂) | CH₃-⬡H- | (CH₃)₂CH—CH₂— | H | M.P. 131 to 133. |
| (53₁) | CH₃-⬡H- | CH₃(C₂H₅)CH— | H | M.P. 146 to 149. |

TABLE 4—Continued

| Compound | R₁ | R₂ | R₃ | Degrees C. |
|---|---|---|---|---|
| (21₂) | CH₃–⟨H⟩– | CH₃–(CH₂)₁₁– | H | M.P. 85 to 87; |
| (54₁) | ⟨H⟩– with CH₃ | ⟨H⟩ | H | M.P. 126 to 129. |
| (11₂) | CH₃–⟨H⟩– | –CH₂–O–CH=CH–CO–NH–⟨H⟩ | | F: 165 to 168; |
| (16₂) | ⟨H⟩–O–CH=CH–CO–NH–CH₂–CH(CH₃)₂ | | | F: 89 to 90. |

It will be realized that all of the foregoing compounds contemplated by the present invention possess the desired selective pesticidal, especially arthropodicial, i.e. insecticidal or acaricidal, properties for combating insects and acarids, and that such compounds have not only a comparatively slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicial activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. β-alkoxy-acrylic acid amide of the formula $$R_1O-CH=CH-CO-N\langle{R_2 \atop R_3}$$

in which R₁ is selected from the group consisting of alkyl of 3–12 carbon atoms, cycloalkyl of 5–7 ring carbon atoms, alkyl-substituted cycloalkyl of 5–7 ring carbon atoms having 1–3 carbon atoms in the alkyl substituent moiety, and alkyl-substituted cycloalkyl-alkyl having 1–3 carbon atoms in the alkyl substituent moiety, 5–7 ring carbon atoms in the cycloalkyl moiety and 1–4 carbon atoms in the alkyl moiety; R₂ is selected from the group consisting of alkyl of 1–12 carbon atoms, alkenyl of 3–6 carbon atoms, cycloalkyl of 5–7 ring carbon atoms, alkyl-substituted cycloalkyl of 5–7 ring carbon atoms having 1–3 carbon atoms in the alkyl substituent moiety, phenyl-alkyl having 1–4 carbon atoms in the alkyl moiety, and chloro-substituted phenyl-alkyl having 1–4 carbon atoms in the alkyl moiety; and R₃ is selected from the group consisting of hydrogen, alkyl of 1–4 carbon atoms, alkenyl of 2–6 carbon atoms, cycloalkyl of 5–7 ring carbon atoms, and phenyl-alkyl having 1–4 carbon atoms in the alkyl moiety.

2. Compound according to claim 1 wherein R₁ is selected from the group consisting of C₃₋₈ alkyl, C₅₋₇ cycloalkyl, C₁₋₃ alkyl-C₅₋₇ cycloalkyl, and C₁₋₃ alkyl-C₅₋₇ cycloalkyl-C₁₋₂ alkyl; R₂ is selected from the group consisting of C₁₋₁₂ alkyl, C₃₋₄ alkenyl, C₅₋₇ cycloalkyl, C₁₋₃ alkyl-C₅₋₇ cycloalkyl, phenyl-C₁₋₂ alkyl, and chlorophenyl-C₁₋₂ alkyl; and R₃ is selected from the group consisting of hydrogen, C₁₋₄ alkyl, C₂₋₄ alkenyl, C₅₋₇ cycloalkyl, and phenyl-C₁₋₂ alkyl.

3. Compound according to claim 1 wherein R₁ is selected from the group consisting of C₃₋₈ alkyl, cyclohexyl, C₁₋₃ alkyl-cyclohexyl, and C₁₋₃ alkyl-cyclohexyl-C₁₋₂ alkyl; R₂ is selected from the group consisting of C₁₋₂ alkyl, cyclohexyl, and C₁₋₃ alkyl-cyclohexyl; and R is selected from the group consisting of hydrogen, and C₁₋₄ alkyl.

4. Compound according to claim 1 wherein such compound is β-(n-butoxy)-acrylic acid N-isobutyl-amide of the formula $$CH_3(CH_2)_3O-CH=CH-CO-NH-CH_2-CH(CH_3)_2$$

5. Compound according to claim 1 wherein such compound is β-isobutoxy-acrylic acid N-isobutyl-amide of the formula $$(CH_3)_2CH-CH_2-O-CH=CH-CO-NH-CH_2-CH(CH_3)_2$$

6. Compound according to claim 1 wherein such compound is β-(n-butoxy)-acrylic acid N-(sec.-butyl)-amide of the formula $$CH_3(CH_2)_3-O-CH=CH-CO-NH-\underset{C_2H_5}{\overset{CH_3}{\underset{|}{\overset{|}{C}H}}}$$

7. Compound according to claim 1 wherein such compound is β-isobutoxy-acrylic acid N-(tert.-butyl)-amide of the formula $$(CH_3)_2CH-CH_2-O-CH=CH-CONH-C(CH_3)_3$$

8. Compound according to claim 1 wherein such compound is β-isobutoxy-acrylic acid N-cyclohexyl-amide of the formula $${CH_3 \atop CH_3}\!\!>\!\!CH-CH_2-O-CH=CH-CONH-\langle H \rangle$$

9. Compound according to claim 1 wherein such compound is β-isobutoxy-acrylic acid N-(3-methyl-cyclohexyl)-amide of the formula $$(CH_3)_2CH-CH_2-O-CH=CH-CO-NH-\langle\overset{CH_3}{H}\rangle$$

10. Compound according to claim 1 wherein such compound is β-isobutoxy-acrylic acid N-(4-methyl-cyclohexyl)-amide of the formula $$(CH_3)_2CH-CH_2-O-CH=CH-CONH-\langle H \rangle-CH_3$$

References Cited

Kolodkina et al., Zhurnal Organ, Khimie, 1966, 2(1), pp. 66–73 (C.A.) 64: 14087c.

LEWIS GOTTS, Primary Examiner

E. G. LOVE, Assistant Examiner

U.S. Cl. X.R.

424—320

UNITED STATES PATENT OFFICE
CERTIFICATE OF CORRECTION

PO-1050
(5/69)

Patent No. 3574748     Dated April 13, 1971

Inventor(s) Dietmar Mayer, Klaus Sasse and Ingeborg Hammann

It is certified that error appears in the above-identified patent and that said Letters Patent are hereby corrected as shown below:

Col. 3, line 41 (Spec. p. 6, line 26)

"$C_{1-22}$" should be -- $C_{1-12}$ --

Col. 4, line 13 (Spec. p. 8, line 13)

"persence" should be -- presence --

Col. 6, line 75 (Spec. p. 15, line 24)

"instant" should be -- instance --

Col. 10, Table 3, last line of last column heading (Spec. p. line 7)

"3 days" should be -- 48 hours --

Col. 15, line 48 (Spec. p. 36, Claim 1, line 10)

"312" should be -- 3-12 --

Col. 16, line 19 (Spec. p. 37, line 4)

"$C_{1-2}$" should be -- $C_{1-12}$ --

Col. 16, line 20 (Spec. p. 37, Claim 3, line 5)

"R" should be -- $R_3$ --

Signed and sealed this 24th day of August 1971.

(SEAL)
Attest:

EDWARD M. FLETCHER, JR.            WILLIAM E. SCHUYLER, JR
Attesting Officer                         Commissioner of Patents